Dec. 26, 1967  C. JONES ET AL  3,359,952
PRESSURE BALANCED SEALING CONSTRUCTION
Filed Jan. 6, 1966  3 Sheets-Sheet 1

INVENTORS
CHARLES JONES
WILLIAM S. HADAWAY
WALTER L. HERMES
ARTHUR M. SCHEERER
BY
ATTORNEY

Dec. 26, 1967   C. JONES ET AL   3,359,952
PRESSURE BALANCED SEALING CONSTRUCTION
Filed Jan. 6, 1966   3 Sheets-Sheet 2
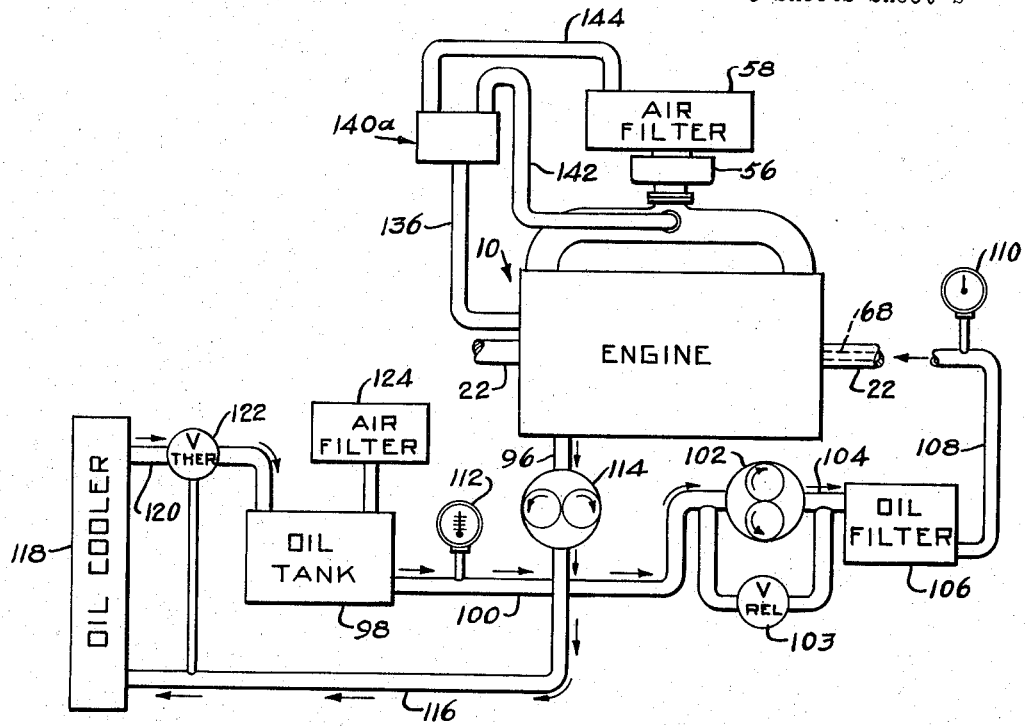
INVENTORS
CHARLES JONES
WILLIAM S. HADAWAY
WALTER L. HERMES
ARTHUR M. SCHEERER
BY
ATTORNEY

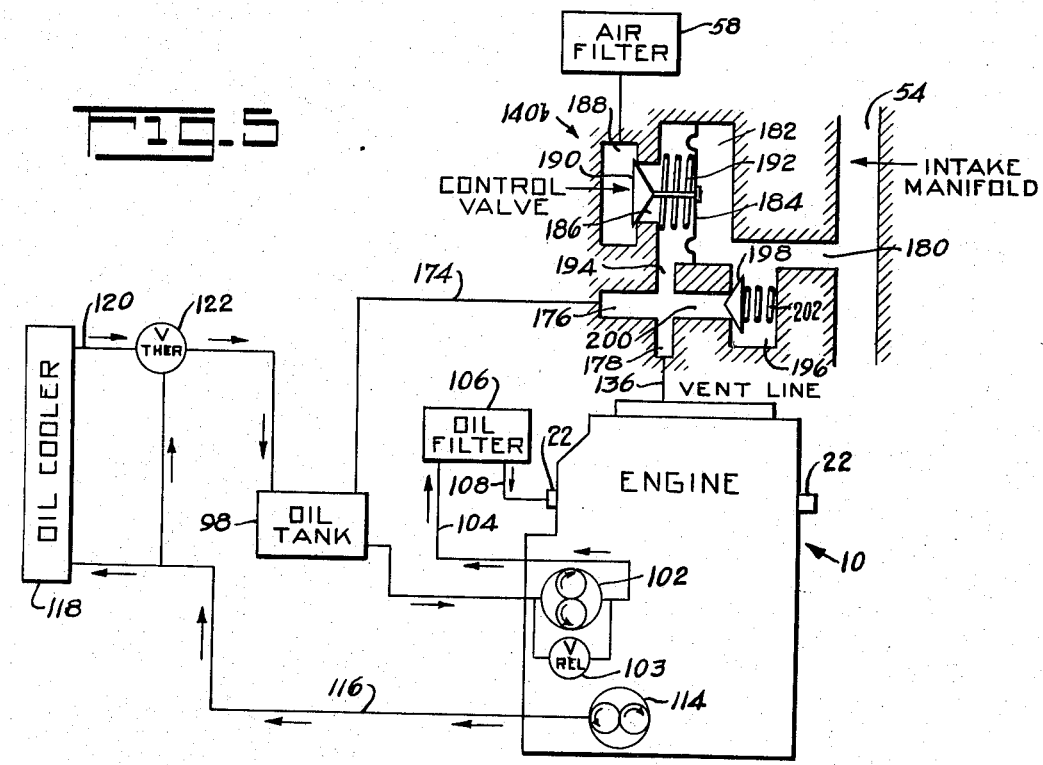
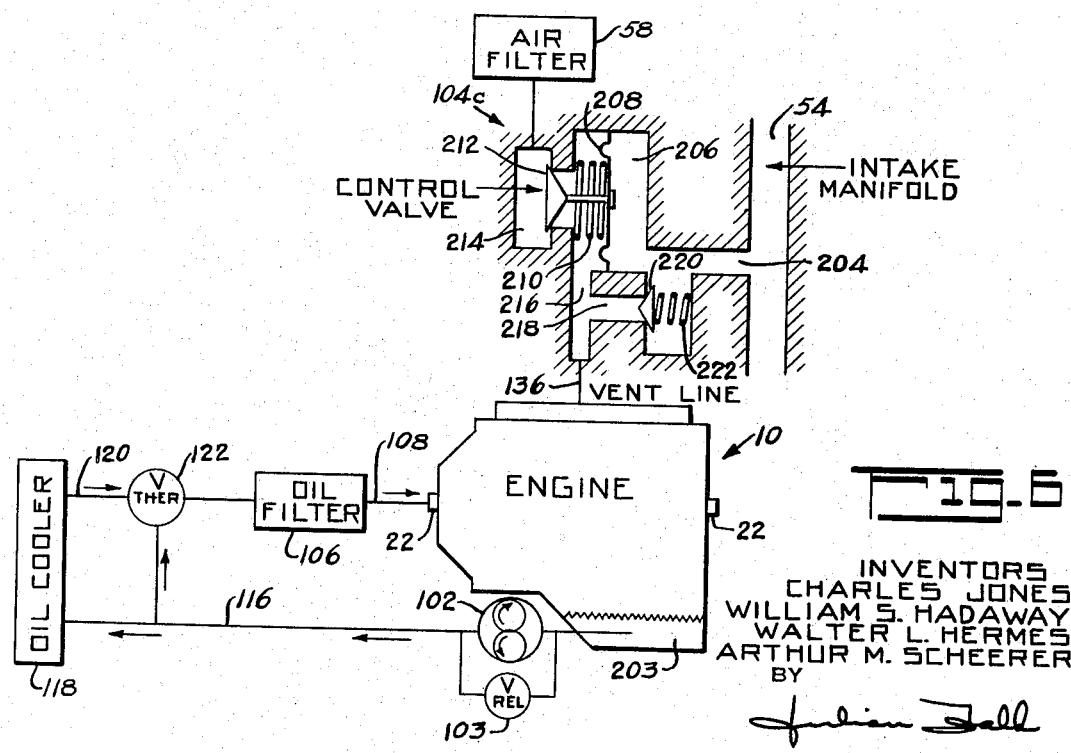

United States Patent Office 3,359,952
Patented Dec. 26, 1967

3,359,952
PRESSURE BALANCED SEALING CONSTRUCTION
Charles Jones, Hillsdale, William S. Hadaway and Walter L. Hermes, Cedar Grove, and Arthur M. Scheerer, Wayne, N.J., assignors to Curtiss-Wright Corporation, a corporation of Delaware
Filed Jan. 6, 1966, Ser. No. 519,101
7 Claims. (Cl. 123—8)

ABSTRACT OF THE DISCLOSURE

A pressure responsive means for equalizing pressure on both sides of an oil seal disposed between the crankcase and the operating chamber of an internal combustion engine.

---

This invention relates to a pressure balancing construction for the seal means in interal combustion engines. More particularly, the invention is directed to a means for balancing the pressures acting on the oil seal means in a rotary combustion engine.

The invention is preferably embodied in a rotary combustion engine and will be described herein in relation to such engines, although it should be understood that the invention is not so limited. Rotary combustion engines of the type described herein are preferably of the so-called Wankel type and reference may be made to United States Patent No. 2,988,065, issued to Felix Wankel et al., for a more detailed description of this type of engine.

As is known in this type of engine, the rotor is provided with gas seals adjacent its outer periphery for sealing engagement with the side housings to seal the working chambers at each side of the rotor. Additionally, oil seal means are provided radially inwardly of the gas seals to prevent leakage of oil from the crankcase region radially outwardly into the working chambers. In one form of the rotating combustion engine the intake ports for the working chambers are located in the side housings and are periodically traversed by the gas seals of the rotor. During part of each revolution of the engine shaft, an intake port after being closed by the passing of a gas seal, is connected to the area defined between the gas seals and the oil seal. It will be seen therefore that this space between the seals communicates with the pressure in the intake manifold. Further, when the oil system is of the dry-sump type, a scavenge pump is provided for removing the oil from the crankcase region after circulation through the engine and a pressure pump is provided for circulating the oil back into the engine after cooling and filtering which oil is then used for cooling the rotor and lubricating the engine bearings. It is customary to make the oil scavenge pump of somewhat larger capacity than the pressure pump due to the fact that the scavenge pump is usually pumping heated and somewhat dirty oil with a substantial amount of air entrained therein and the tolerances required, as well as wearing conditions this pump may be exposed to, make it impractical to make the two pumps of equal capacity. Because the scavenge pump is of somewhat larger capacity, this pump will pump some gases from inside the engine case and cause the pressure in the crankcase to decrease relative to the pressure in the intake manifold. However, at other times during engine operation, such as during a rapid depression of the throttle, the pressure in the intake manifold will decrease relative to the pressure in the crankcase which can result in oil being blown by the oil seal from the crankcase region. The oil seal, being disposed between the crankcase and the intake manifold, is therefore periodically exposed to a differential in pressure across said seal which may affect the sealing contact of the oil seal with its sealing surfaces and therefore tend to induce oil leakage into the working chambers.

It is a prime purpose of the present invention to provide means for balancing the pressures across the oil seal, so that at any throttle position, the pressures across said seal will be in balance which therefore eliminates any detrimental effect of the pressure acting on the oil seal and minimizes leakage across said seal. The invention is generally carried out by providing a valve means which communicates with the pressure in the intake manifold and the crankcase and which valve means includes means responsive to changes in the pressure for providing an increase in pressure to the lower pressure region so as to balance the pressure differential. Thus, if the pressure in the intake manifold is higher, relative to the pressure in the crankcase, the valve means will provide an increase in pressure to the crankcase region to balance the pressure in the intake means and the crankcase region so that the oil seal means will be relatively unaffected.

Accordingly, it is one object of the invention to provide a novel pressure balanced sealing construction for an internal combustion engine.

It is another object of the invention to provide a novel and improved pressure balanced sealing construction for an internal combustion engine wherein pressure differentials across the oil seals are minimized for preventing oil leakage across said seals.

It is a further object of the invention to provide a novel pressure balanced sealing construction for an internal combustion engine having a dry-sump oil system.

It is still a further object of the invention to provide a novel pressure balanced sealing construction for an internal combustion engine having a wet-sump oil system.

Other objects and advantages of the invention will be best understood upon reading the following detailed description with the accompanying drawings wherein:

FIG. 3 is a schematic representation showing an internal combustion engine embodying the invention and including a dry-sump oil system which may be used with the invention;

FIG. 4 is a sectional view of a valve means which may be used with the invention;

FIG. 5 is a schematic representation of a dry-sump oil system for an internal combustion engine and also schematically illustrates another valve means which may be used with the invention; and FIG. 6 is a schematic representation of a wet-sump oil system and also schematically illustrates a valve means of the invention used with such an oil system.

Figures 1, 2:
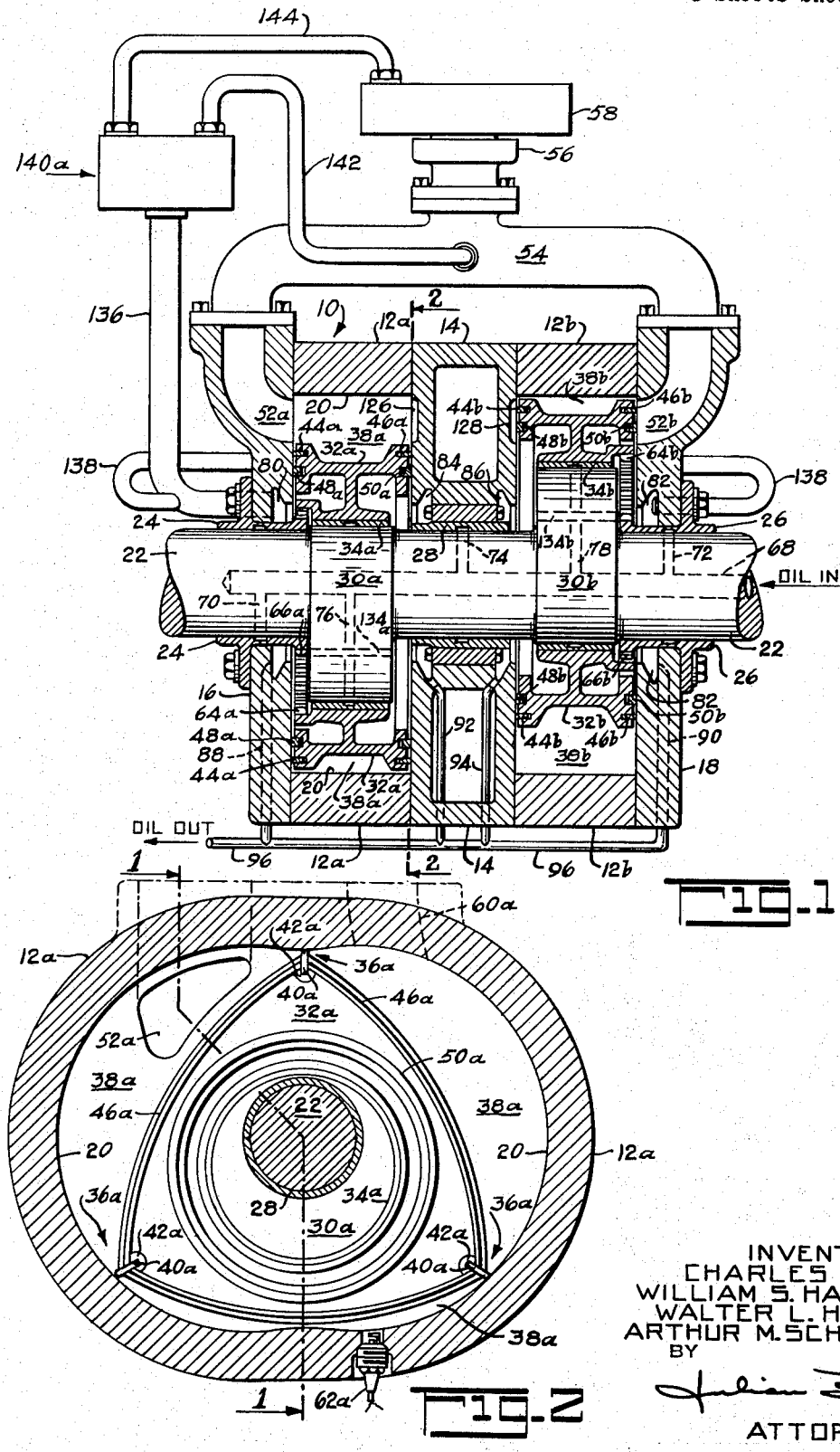
FIG. 1 is an axial sectional view of a rotary combustion engine taken along line 1—1 of FIG. 2.
FIG. 2 is a sectional view taken along line 2—2 of FIG. 1.

Referring to FIGS. 1 and 2, the invention is shown therein as being preferably embodied in a rotary combustion engine of the Wankel type. In general, the rotary combustion engine illustrated comprises an outer body 10 including a pair of spaced peripheral walls 12a and 12b, each being interconnected with a common intermedaite wall 14, and having end walls 16 and 18 respectively connected to said peripheral walls 12a and 12b at their axial outer ends. As shown in FIG. 2, the profile of the inner surface 20 of the peripheral walls 12a and 12b is preferably basically an epitrochoid. A shaft 22 is coaxially supported in the outer body 10 by suitable bearings 24 and 26 at end walls 16 and 18, respectively, and bearing 28 at the intermediate wall 14. The shaft 22 is provided with eccentric portions 30a and 30b, one being disposed in each cavity of the outer body 10, with said eccentric portions 30a and 30b respectively supporting rotors 32a and 32b for rotation relative thereto. The rotors 32a and 32b are respectively supported on said eccentric portions 30a and 30b by suitable bearings such as illustrated at 34a and 34b.

As illustrated in FIG. 2, the rotors are preferably three-lobed with the lobe junctions of the rotor forming three apex portions 36a on rotor 32a and 36b in rotor 32b (apex portion 36a only being shown), which apex portions are disposed for sealing engagement with the inner surface 20 of the respective outer body peripheral walls 12a and 12b. A plurality of working chambers 38a and 38b are formed respectively in each unit between the outer peripheral surface of the rotor and the inner peripheral surface of the outer body peripheral wall, which working chambers vary in volume during relative rotation of the rotor and outer body.

In order to maintain effective sealing of the working chambers, apex seal members 40a, FIG. 2, and 40b (not shown) are respectively provided in grooves in each apex portion of the associated rotor 32a or 32b. Intermediate seal bodies 42a, FIG. 2, and 42b (not shown) respectively meet with the associated apex seals 40a and 40b in each rotor and also mate with side face seals 44a, 44b and 46a, 46b respectively in each side face of each rotor to form a continuous seal for each of the working chambers 38a and 38b, respectively. As seen in FIG. 2, the side face or gas seals are disposed adjacent to the outer periphery of the rotor in a side face thereof. Oil seals 48a and 48b are disposed in one side face of each rotor and oil seals 50a and 50b are disposed in the other side face of each rotor adjacent their inner peripheries to prevent oil from leaking radially outwardly into the working chambers 38a and 38b, respectively, so that the combustible charge will not be fouled by the presence of oil therein and also to minimize fouling of the spark plugs and other seal elements as well as minimize the oil consumption. As will be explained hereinafter, it is a prime function of the invention to provide means to promote efficient operation of the oil seals.

Intake ports 52a and 52b are respectively provided in each of the end walls 16 and 18 for supplying air or a fuel-air charge to the working chambers during operation of the engine. The intake ports 52a and 52b communicate through channels in each of the end walls 16 and 18 to a common intake manifold 54 which is provided with a carburetor or the like 56, diagrammatically illustrated in FIG. 1, which in turn is provided with an air cleaner or filter 58 of a well-known type. An exhaust port is also provided for expelling the burnt gases from the engine with one of said exhaust ports being illustrated at 60a in FIG. 2. Ignition means may also be provided for igniting the combustible mixture in the working chambers such as the spark plug 62b illustrated in FIG. 2. An exhaust port and a spark plug (not shown) are also provided for the other unit of the multi-unit engine illustrated in FIG. 1. It should be understood that additional intake ports for each of the units may also be provided in the common end wall 14 which communicate with the intake manifold 54 to provide dual intake ports for each unit.

As described above, the rotors 32a and 32b rotate relative to the shaft 22 about the axis of said rotors and due to the fact that the rotors are eccentrically mounted, said rotors also describe a planetary motion relative to the outer body. In the embodiment illustrated the shaft and rotors rotate at a ratio of 3:1 relative to one another. In order to aid and maintain the relative motion of the rotors and the shaft, an internally toothed gear is suitably fixed to each of the rotors 32a and 32b, said gears being illustrated at 64a and 64b, respectively, which gears mesh with externally toothed gears 66a and 66b, respectively fixed to an outer body end wall 16 and 18.

Lubricating oil is supplied to the engine through a bore 68 centrally disposed in the shaft 22 in a manner which will be more fully explained below. The lubricating oil is used for lubricating the bearings 24, 26 and 28 and for cooling the interior of the rotors 32a and 32b. Passageways 70, 72, and 74 in the shaft 22 connect the bore 68 in said shaft to annuli respectively disposed in the bearings 24, 26 and 28 for supplying lubricating oil from said bore 68 to the associated bearings. Passageways 76 and 78 respectively disposed in the eccentric portions 30a and 30b connect the bore 68 to annuli in the bearings 34a and 34b, respectively, for supplying lubricating oil to the bearings supporting the rotor on the eccentric portions. As explained in U.S. Patent No. 3,176,915, issued April 6, 1965, during rotation of the rotor relative to its eccentric portion, its associated bearing will become unloaded whereupon the oil may leak out of the ends of the bearing and at the location where the acceleration forces generated during rotor rotation have radially outwardly directed components, the oil will be thrown radially outwardly into the hollow rotor for cooling the inner surface thereof. Thus, the oil supplied to the bearings 34a and 34b in FIG. 1 will be periodically thrown radially outwardly into the hollow rotor for cooling said rotors, whereupon it will be seen that the oil is used for both lubrication and cooling purposes. Reference may be made to said Patent No. 3,176,915 for a more detailed description of the rotor cooling which also discloses additional means for supplying cooling oil to the rotor interior.

As the rotor rotates, the acceleration forces periodically reverse and the oil will be thrown radially inwardly where it can be collected in cavities 80 and 82 provided respectively in end walls 16 and 18 and cavities 84 and 86 provided in the common intermediate wall 14. It will be seen therefore that the region radially inwardly of the oil seals 48a, 50a and 48b, 50b and the outer surface of the shaft 22 will be a region wherein oil may collect and will hereinafter be referred to as the crankcase region. The oil collected in the collection cavities 80, 82, 84 and 86 may be drained from the engine through suitable passageways 88, 90, 92 and 94 connecting said collection cavities to a discharge oil line 96 which is suitably connected to an oil pump, as will be explained hereinafter.

Referring to FIG. 3, a dry-sump oil system is diagrammatically illustrated therein and comprises an oil tank or reservoir 98 which is separate from the engine proper itself and is connected to the engine lubrication and oil cooling system through an oil line 100 which feeds into a pressure pump 102. A relief valve 103 is connected across pump 102 to recirculate the oil should the pressure exceed a predetermined value. The pressure pump 102 may be suitably driven from the engine shaft or the like for pumping oil from the tank 98 into a discharge line 104, through a known type oil filter 106 and through line 108 into the bore 68 of the engine shaft 22. A suitable pressure gauge 110 may be disposed in line 108 to indicate the oil pressure being supplied to the engine. Likewise, a temperature gauge 112 may be placed in the line 100 to indicate the oil temperature being fed from the tank 98.

As explained above, the oil is circulated through the engine for lubricating the bearings and cooling the rotors and is then collected in the oil collection cavities 80, 82, 84 and 86 for removal and recirculation through the engine. In order to remove the oil from the collection cavities, a scavenge pump 114 is provided which pumps the oil out from the collection cavities through the oil discharge line 96. It will be apparent that the discharge oil removed from the engine by the pump 114 will be relatively hot and will also have some gases entrained therein. Because of this, the pump 114 normally is made with slightly greater tolerances than the pressure pump 102. Also, because the scavenge pump must remove all the oil supplied by the pressure pump plus any entrained gases carried by the oil, the scavenge pump 114 normally has a larger capacity pump than the pressure pump 102.

As will be explained hereinafter, the pumping action of the scavenge pump 114 will have an effect on the oil sealing system.

The oil removed from the engine by the scavenge pump 114 is pumped into an oil line 116 which is the input line to an oil cooler or radiator 118. The oil cooler 118 may be any well-known type oil cooler wherein the hot oil is supplied thereto and cooled before recirculation into the engine. The oil cooler 118 has an output line 120 which is connected to the oil tank 98 for supplying the cooled oil from the cooler 118 to tank 98 so that the oil may be recirculated to the engine as described above. The oil flow from the oil cooler 118 is controlled by a thermostatic valve 122 connected across the lines 116 and 120 for measuring the temperature of the oil and controlling the flow into the oil tank 98. The thermostatic valve 122 may be of any well-known type. An air filter 124 may be provided for the oil tank 98 for screening out any contaminants in the air and also serves as a pressure balancing device in that any excess pressure in the oil tank may be bled out through the air filter or if there is a pressure drop in the oil tank 98, atmospheric air pressure may enter through the air filter to balance the pressure in said tank.

Since the scavenge pump 114 has an excess capacity, the pump 114 will remove some gases from the crankcase region along with the oil drained therefrom. Thus, the pump 114 will have the effect of dropping the pressure in the crankcase region. At times the reduction of pressure in hte crankcase region brought about by the pump 114 will be such that this pressure will be substantially reduced relative to the pressure in the intake manifold. With reference to FIG. 1, therefore, it will be seen that the pressure radially inwardly of the oil seals may at times be lower than the pressure on the radially outward side of the oil seal. It will be further seen in FIG. 1, with reference to rotor 32b, that the space defined between the side face gas seals and the oil seals will at times be in communication with an intake port 52a or 52b, as shown by gas seal 46b and oil seal 50b. This pressure may also be communicated to the space between the gas seal on the side of the rotors opposite from the intake ports by providing cavities 126 and 128 of the same size as the intake port in the wall 14 so that the pressure in the working chambers may communicate with the space between the gas seal and oil seal on this side of the rotor. Reference may be made to United States Patent No. 2,979,042, issued to Max Bentele on April 11, 1961, for a more detailed description of balancing the pressure on each side of the rotor. It should be further understood, however, that intake ports may be provided on both sides of each of the rotary units instead of the single intake ports for each unit as illustrated. It will be further seen that passage means may be provided through each eccentric portion, 134a and 134b, respectively, for balancing the pressure in the crankcase region on each side of the rotor in each of the rotary units.

It will therefore be apparent that at times one side of an oil seal will be exposed to intake manifold pressure while the other side is exposed to crankcase pressure which will result in a differential in the pressure across said oil seal. When there is a differential in pressure across the oil seals, it may cause the seals to lift away from their sealing surfaces or to blow oil into the inter-seal area which will tend to induce oil leakage across said seals and therefore may result in an unduly high oil consumption, as oil leakage across said seals will eventually be drawn into the combustion chamber and consumed therein. It is therefore desirable to balance the pressures across the oil seal to prevent oil leakage and to maintain a pressure balanced oil seal for any position of the throttle. As is well known, the pressure in the intake manifold will vary according to the throttle position. Thus, it should be taken into account that the pressure in the intake manifold will vary relative to the pressure in the crankcase region.

In order to carry out the prime objects of the invention, a valve means is provided which is in communication with the pressures in the intake manifold and in the crankcase region which valve means is operative for supplying pressure to at least one of these regions which has the lower pressure for minimizing the differential in pressure across the oil seal. FIGS. 1, 3 and 4 are illustrative of one embodiment of the invention. As shown in FIG. 1, a breather pipe 136 is connected to end wall 16 and is in communication with the oil collection cavity 80 and thus the crankcase region on the gear side of the rotor 32a and through passage 134a in the eccentric portion to the opposite side of the rotor 32a. A connecting pipe 138 communicates with the breather pipe 136 and with the crankcase region on the gear side of the rotor 32b and through passage 134b with the crankcase region on the opposite side of the rotor 32b. A pressure balancing valve mechanism designated at 140a is connected to the breather pipe 136 and is also provided with a pipe or line 142 which is connected to the intake manifold 54 and the valve means 140a and a pipe or line 144 which is connected to the air filter 58 and the valve means 140a.

Referring to FIG. 4, the valve means 140a is shown therein as being provide with a cavity 146 to which the breather pipe 136 is connected. A passageway 148 is provided in said valve body and connects the cavity 146 to a cavity 150. As can be seen in said FIG. 4, a flexible diaphragm member 152 is provided in the cavity 150 and divides said cavity 150 so that the passageway 148 communicates with only one side thereof. The line 142 from the intake manifold connects to the valve member 140a and a passageway 154 therein which communicates with the side of the cavity 150 on the opposite side of the diaphragm 152 from the passageway 148. A spring 156 and a piston 158 are positioned in the valve body 140a and provide a fixed force on one side of the diaphragm which force can be set or adjusted by an adjustable screw member 160 primarily to balance the opposing spring force from the spring 170. The line 144 from the air filter 58 is connected to a passageway 162 in the valve body 140a which in turn is connected to a cavity 164. A passageway 166 connects the cavity 164 to the cavity 150 containing the diaphragm member 152. A piston valve member 168 is disposed in the passageway 166 with the head portion thereof serving as a valve means to open or close the passageway 166 between the cavity 164 and the cavity 150. A return spring member 170 is provided for returning the piston valve member 168 to a closed position, as will be explained hereinafter. The stem portion of the piston valve member 168 rests against the plate member provided on the diaphragm member 152 so that the piston valve member 168 may be moved in response to movement of the diaphragm member 152.

When the pressure from the intake manifold and the force from the spring 156 on one side of the diaphragm member 152 exceeds the pressure from the spring 170 and the pressure from the crankcase supplied to the opposite side of the diaphragm member 152, which is normally below atmospheric pressure, the diaphragm member 152 will be forced downwardly and force the valve member 168 downwardly to open cavity 164 to the cavity 150 through the passageway 166. Air pressure from the air filter 58, which is air under atmospheric pressure, may then flow through the passageway 162 into the cavity 164, passageway 166, cavity 150 and into the passageway 148 to the cavity 146 and ultimately to the crankcase region for supplying additional pressure to said crankcase region. It will thus be apparent that, when the pump 114 reduces the pressure in the crankcase region below the relative pressure in the intake manifold, atmospheric air pressure will be supplied to the crankcase region for balancing the pressure on each side of the oil seal means. When the pressure in the crankcase region is balanced, the diaphragm member will again be raised up along with the return spring 170 which will also push the piston 168 to a closed position. A passageway 172 is also provided which communicates with the passageway 162 and a cavity containing the spring 156 and the piston 158 in order to allow motion of the piston without entrapped air above it, which would create an unbalancing force on the system.

Referring to FIG. 5, another embodiment of the valve mechanism is shown therein for a dry-sump oil system similar to that shown in FIG. 3 and like numerals are shown for like elements. As described above, the scavenge pump 114, because of its oversized capacity, will pump some gases from the crankcase region into the oil tank 98. In the embodiment of FIG. 5, instead of providing an air filter as a balancing device in the oil tank 98, a line 174 is provided which connects the oil tank to the valve mechanism 140b wherein the excess gases containing an amount of entrained oil vapor are returned to the engine case by way of the line 174, the passageway 176, and the passageway 178 in the valve mechanism 140b and to the breather line 136 connected to the crankcase region.

The intake manifold 54 is connected through a passageway 180 to a cavity 182, which cavity 182 has a diaphragm 184 supported therein. The cavity 182 is provided with an aperture or passageway 186 which connects the cavity 182 to a cavity 188 to which the air filter 58 is connected. A valve member 190 is disposed in the aperture 186 and is connected to the diaphragm member for opening and closing the aperture 186 between the cavities 182 and 188 in response to movement of the diaphragm 184. A spring 192 is provided on one side of the diaphragm 184 for biasing the diaphragm in a direction to close the opening of the passageway 186 by moving the valve member 190 to a closed position. The pressure from the crankcase region communicates to the side of the diaphragm member 184 opposite from the side to which the intake manifold communicates through the breather line 136, passageway 178, and a passageway 194 leading to the cavity 182.

When the manifold pressure increases relative to the pressure in the crankcase region, which may happen due to a rapid opening of the throttle or because of the pump 114, the diaphragm 182 will be moved against the bias of the spring 192 to move the valve member 190 for opening the passageway 186. At this time, atmospheric air pressure will enter the cavity 188 from the air filter 58, pass through the opening 186 into the cavity 182 through passageways 194, 178 and breather line 136 into the crankcase region. Thus, the pressure in the crankcase region will be relatively increased to balance the pressure in the intake manifold for minimizing the pressure differential across the oil seal, similar to that described above. At the same time, the pressure from the intake manifold will pass into a cavity 196 which contains a valve member 198 which is positioned for opening or closing a passageway 200 connected to said passageways 176 and 178. The valve member 198 is normally biased to a closing position by a spring member 202 and the increase in pressure in the intake manifold will maintain the valve member 198 in a closed position to prevent the combustible mixture from the intake manifold from entering into the crankcase region through the passageways 200 and 178 and breather line 36.

If the relative pressure in the crankcase region should increase so that it is substantially greater than the pressure in the intake manifold, as may occur during some conditions of nearly closed throttle positions, the pressure from the crankcase region will pass into the cavity 182 through the breather line 136 and passageway 194 to act against the diaphragm 184 for moving said diaphragm in a direction to close the opening 186 through valve member 190. At the same time, the pressure from the crankcase region will pass through the passageway 200 to open said passageway to the cavity 196 by forcing the valve member 198 to an open position. When the valve member 198 is in an open position, gas pressure from the excess recirculated air will pass into the cavity 196 through passageway 180 and into the intake manifold to supply additional pressure for balancing the differential pressure across the oil seal. The gas pressure from the crankcase region will contain some amount of entrained oil vapor, which upon passing into the working chambers through the intake manifold, will enhance the performance of the sealing means for the working chambers by providing lubrication for said sealing means. Thus, it will be seen that, in the embodiment of FIG. 5, balancing means are provided for both situations wherein either the intake manifold pressure is greater than the crankcase pressure or wherein the crankcase pressure is greater than the intake manifold pressure. It will be apparent therefore that whatever the differential in pressure amounts to, means are provided for balancing the differential in pressure so that the crankcase pressure and manifold pressure will be brought into balance so that the oil seal means will be relatively unaffected by pressure differentials during engine operation.

In FIG. 6 there is shown therein an embodiment of the invention for a wet-sump oil system. In the wet-sump system of FIG. 6, the oil reservoir 203 is embodied in the engine proper similar to that in the standard reciprocating engines in use today. The oil is permitted to drain into the reservoir 203 and is pumped therefrom by a pressure pump 102 into the cooler 118 and recirculated after cooling to the engine shaft 22 under pressure from said pump 102. Since this is a wet-sump system, a scavenge pump is not required. The valve mechanism 140c is connected to the crankcase region and to case pressure through the breather line 136 and to the intake manifold through passageway 204 which connects the intake manifold to a cavity 206 containing a diaphragm 208. As in the above embodiments, the diaphragm has a spring 210 on one side thereof and the valve member 212 is connected therewith for permitting air pressure from the air filter 58 to pass from a cavity 214 into the cavity 206. When the intake manifold pressure exceeds the case pressure, the diaphragm member 208 will push the valve member 212 to open the cavity 214 to the cavity 206 and permit atmospheric air pressure to pass from the air filter through a passageway 216 into the breather pipe 136 and to the crankcase region. Should the case pressure exceed that in the intake manifold, pressure may pass from the breather pipe 136 into the passageway 216 to a passageway 218 which acts to open a valve member 220 which is biased by a spring 222 for permitting the crankcase pressure to bleed off into the passageway 204 and into the intake manifold. Thus, the embodiment of FIG. 6 is similar to that of FIG. 5 except for the fact that the recirculation connection from the oil tank to the valve mechanism 140c is eliminated. Since the oversized scavenge pump is not required in this embodiment, the need for the recirculation line for recirculating excess gases is not necessary.

It will be apparent from the above detailed description that a novel means is provided for balancing the differential in pressure between the intake manifold and the crankcase region so as to minimize the pressure differential across the oil seal means. By minimizing said pressure differential, the oil seal means sealing contact is substantially unaffected by changes in pressures in the intake manifold or the crankcase region. This results in a minimum amount of oil leakage being caused by the seal means being lifted from their sealing surfaces or oil blow-by due to the presence of a pressure differential across the faces of said oil seal means.

While the invention has been described in detail in its preferred embodiments, it will be apparent to those skilled in the art that various changes and modifications may be made therein without departing from the spirit and scope of the invention. It is aimed in the appended claims to cover all such modifications or changes.

What is claimed is:

1. A pressure balanced sealing construction for an internal combustion engine or the like having an outer body containing a cavity, a piston supported on an eccentric shaft and disposed in said cavity for movement relative to the walls of said cavity, intake means communicating with said cavity at one portion thereof and crankcase means communicating with said cavity at another portion thereof with the pressure in said intake meaans and said crankcase means varying relative to one another, said pressure balanced sealing construction comprising oil seal means disposed radially outwardly of said eccentric shaft in sealing engagement with the adjacent walls of said piston and said cavity for sealing said intake means from said crankcase means, said crankcase means being defined between said oil means and the outer peripheral surface of said eccentric shaft, valve means operatively communicating with said intake means and said crankcase means and including means responsive to changes in the relative pressure between said intake means and said crankcase means with said valve means being operative for supplying an increase in pressure to one of said intake means and said crankcase means in response to changes in the relative pressures in said intake means and said crankcase means for minimizing the pressure differential across said seal means.

2. A pressure balanced sealing construction as recited in claim 1 further comprising gas seal means disposed between the adjacent walls of said piston and said cavity walls with said gas seal means being radially spaced from said oil seal means, and said intake means being disposed such that said intake means at least periodically communicates with the space between said gas seal means and said oil seal means whereby said oil seal means is periodically exposed to the pressure in said intake means on one side of said oil seal means.

3. A pressure balanced sealing construction as recited in claim 2 wherein at least during some throttle positions of engine operation the pressure in said intake means is less than the pressure in said crankcase means, and said valve means being operative for supplying an increase in the pressure to said intake means when the pressure in said intake means is less than the pressure in said crankcase means.

4. A pressure balanced sealing construction as recited in claim 2 wherein at least during some throttle positions of engine operation the pressure in said crankcase means is reduced relative to the pressure in said intake means, and said valve means being operative for supplying an increase in pressure to said crankcase means when the pressure in said crankcase means is substantially reduced relative to the pressure in said intake means.

5. A pressure balanced sealing construction as recited in claim 4 wherein said intake means includes a port disposed in a side wall of said cavity and said port periodically communicates with the space between said gas seal means and said oil seal means.

6. A pressure balanced sealing construction as recited in claim 1 further comprising pump means communicating with said crankcase means for removing oil from said engine for recirculation therethrough, said pump means also being effective for lowering the pressure in said crankcase means relative to the pressure in said intake means whereby the pressure on the crankcase side of said oil seal means will decrease relative to the pressure on the intake means side of oil seal means, and said valve means being operative for supplying an increase in the pressure to said crankcase means when the pressure in said crankcase means decreases relative to the pressure in said intake means.

7. A pressure balanced sealing construction as recited in claim 6 wherein said pump means comprises a scavenge pump for pumping oil from said engine to an oil reservoir; a pressure pump for pumping oil from said oil reservoir to said engine for circulation through said engine, said scavenge pump having a relatively larger capacity than said pressure pump such that said scavenge pump will pump gases along with the oil from said engine to said oil reservoir, and said valve means being operably connected to said oil reservoir for removing gases therefrom in response to decreases in the relative pressure in said intake means and said crankcase means.

References Cited
UNITED STATES PATENTS 3,059,628   10/1962   Linn _____ 123—119

RALPH D. BLAKESLEE, *Primary Examiner.*